Feb. 11, 1958  F. B. ZACKS  2,822,862
SEAT THROWS
Filed Aug. 13, 1956  3 Sheets-Sheet 3
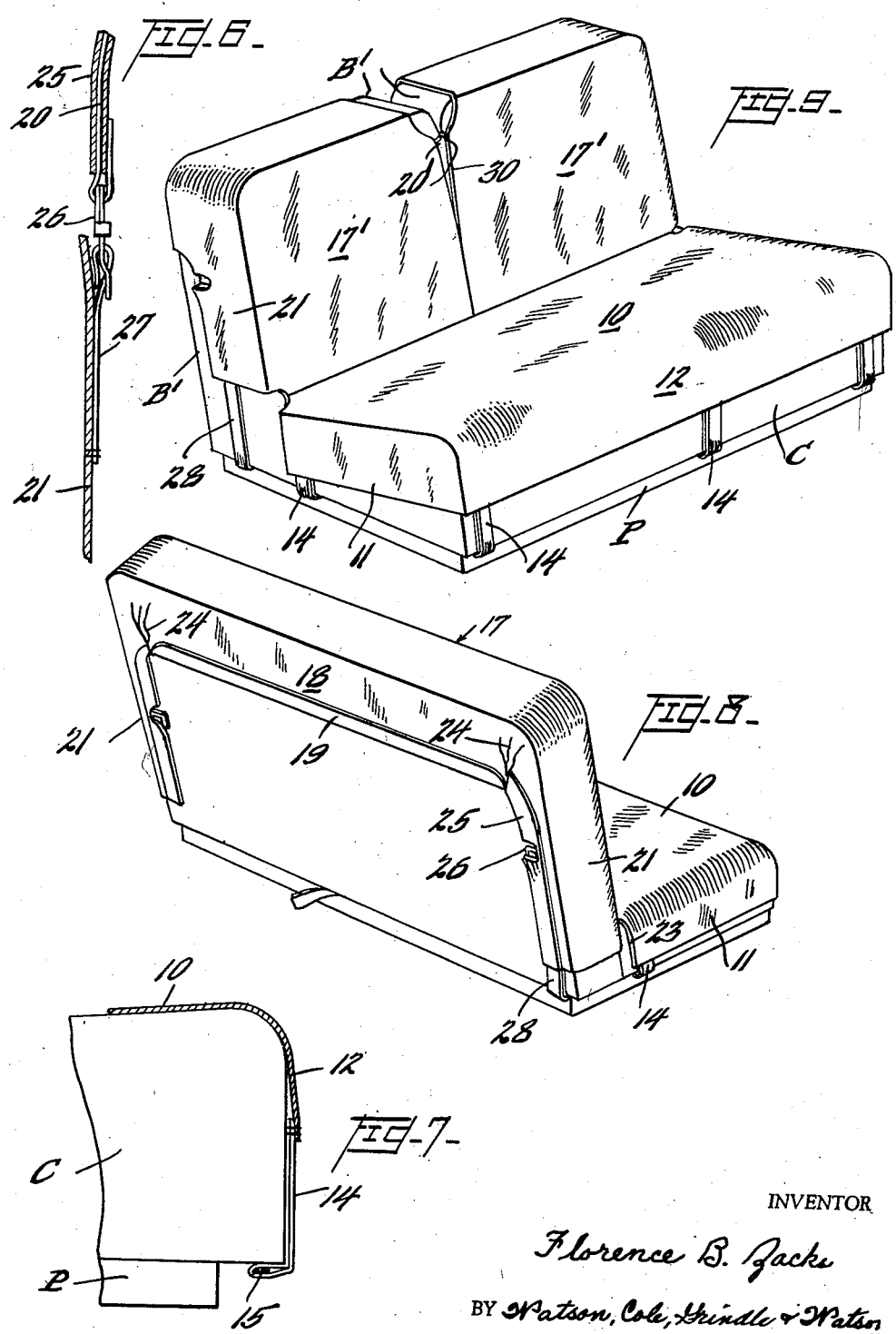
INVENTOR
Florence B. Zacks
BY Watson, Cole, Grindle & Watson
ATTORNEYS

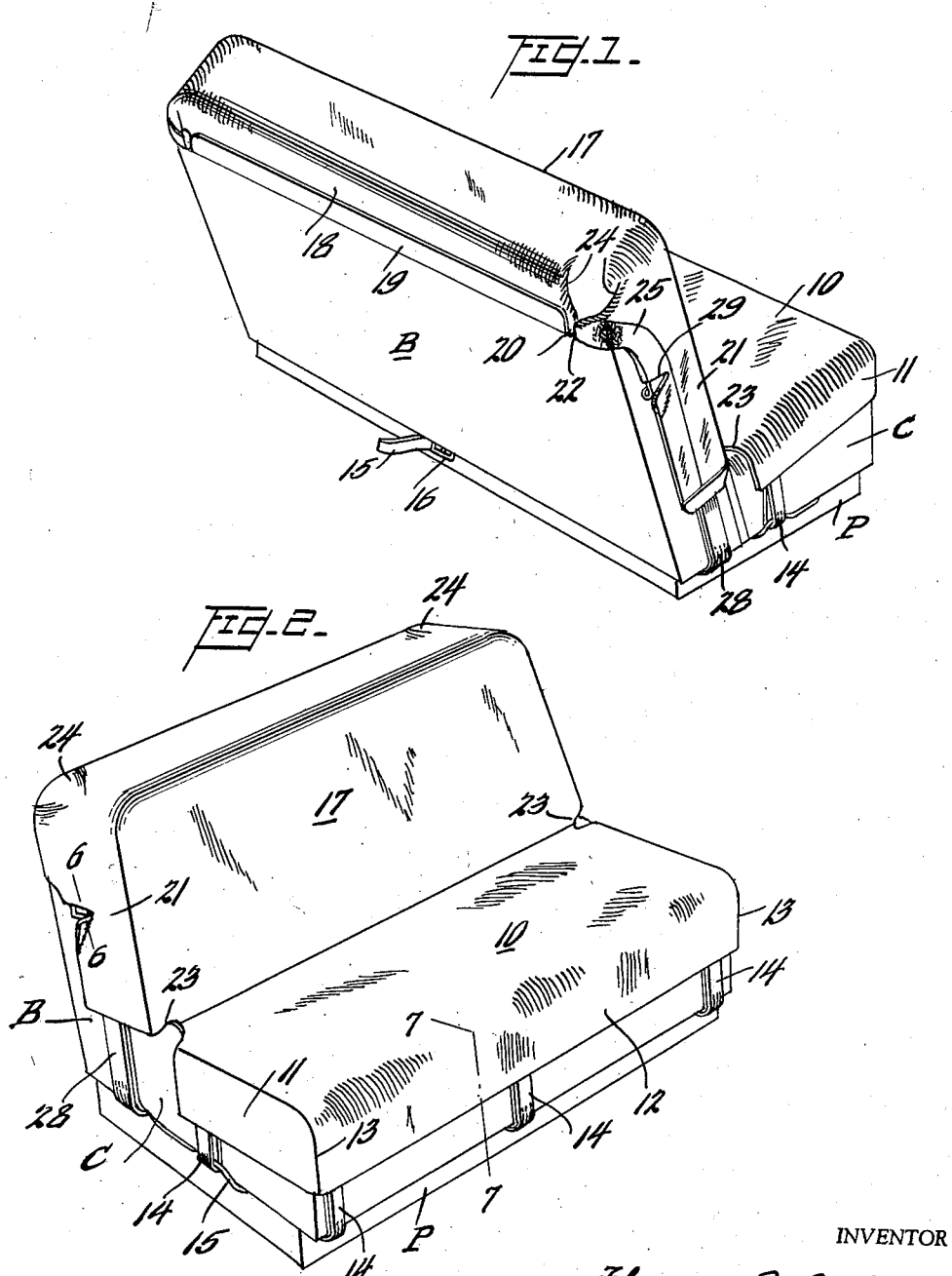

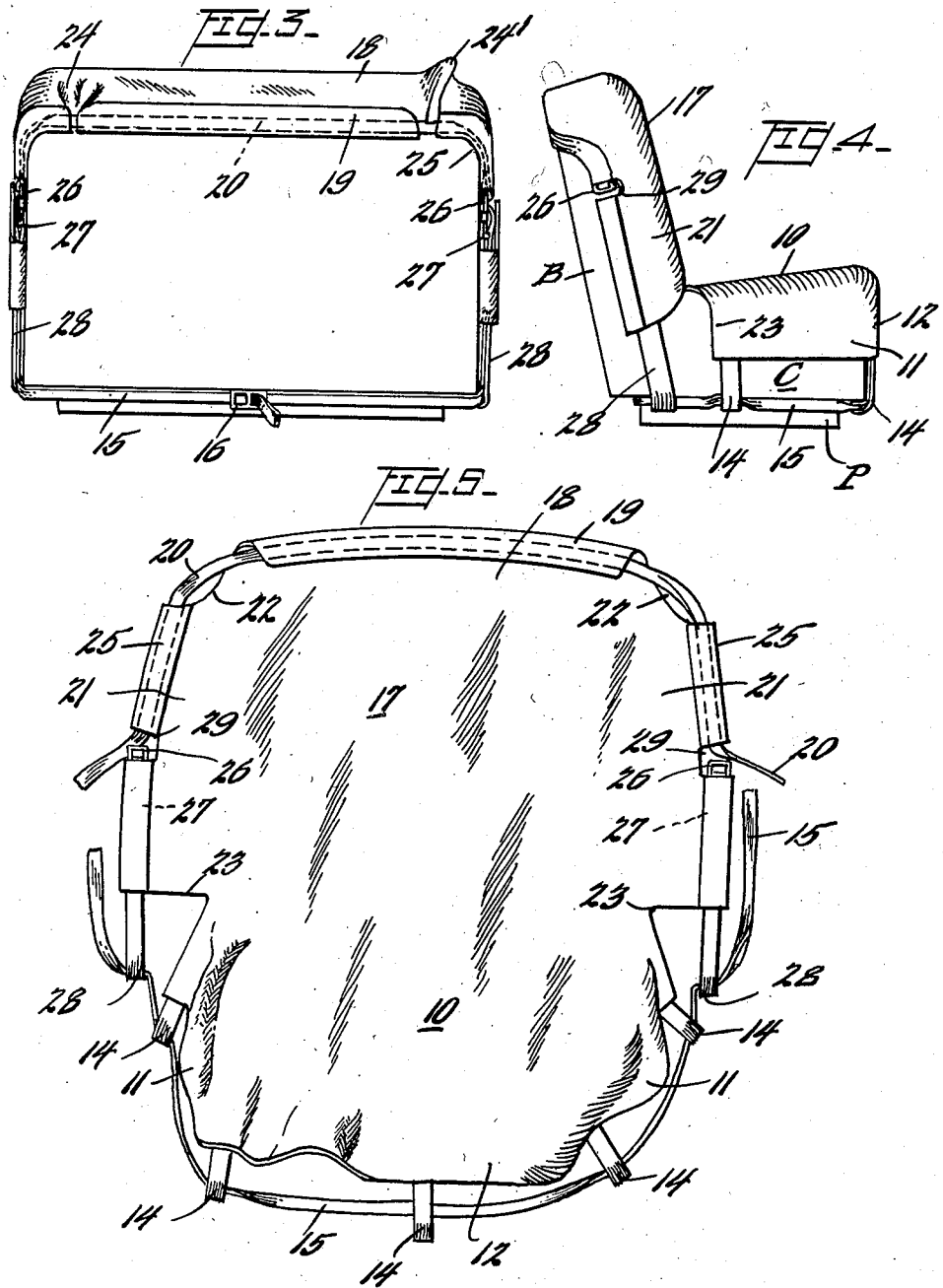

United States Patent Office 2,822,862
Patented Feb. 11, 1958

2,822,862

SEAT THROWS

Florence B. Zacks, Columbus, Ohio

Application August 13, 1956, Serial No. 603,614

11 Claims. (Cl. 155—182)

This invention relates to seat throws or covers for automobile seats and more particularly to such throws which may be adapted for use with automobile seats of varying sizes and shapes.

In particular, the invention contemplates the formation of a seat throw including the seat cushion cover and also the back rest cover from flexible fabric which may be readily and conformally shaped about the cooperating portions of the automobile seat by a novel arrangement of draw straps or strings.

In accordance with an important aspect of the invention, there is utilized a common draw string element for tensioning both the seat cushion cover and the back rest cover. By virtue of its common association with both of said covers or cover sections, said element tends to equalize and uniformly distribute the tension exerted on said sections, while greatly simplifying and facilitating the application of the seat cover to seats of a wide range of sizes and proportions.

Because of the said tension equalizing tendency of the draw string, it is possible by use of the invention to reduce the chances of either of said interconnected cover sections being displaced due to substantial differences in the tension applied thereto.

It is a further feature of the invention to utilize a second or auxiliary draw string, in association with portions of the back rest cover section, to define a pocket in said section for reception of the upper end of the back rest, and to tension the said second draw string through interconnection between it and the first draw string.

The arrangement, further, is such that no portions of the seat throw are locally or fixedly connected to the seat, but the two interconnected back rest and seat cushion cover portions of the throw are free to adjust bodily relative to their respective portions of the seat responsive to the tension imposed on their peripheral portions by their interconnected draw strings. This permits the initially flat throw to be conformingly and neatly fitted upon seats having a wide range of dimensions.

The two draw strings preferably utilize a common side or one which preferably constitutes an integral section of one of the strings and is slideably connected to the other said string. By virtue of their novel interconnected relationship the said draw strings or straps will function to snugly position their cooperating seat throw portions on the seat in a more efficient and neat manner than has heretofore been possible, particularly in the case of seat throws which are adapted for application to a wide range of different sizes and shapes of seats.

The foregoing objects and advantages are attained by the embodiments of the invention illustrated in the accompanying drawings in which:

Figure 1 is a rear perspective view of an automobile seat having the preferred form of seat cover of the invention applied thereto;

Figure 2 is a front perspective view of the seat and seat cover shown in Figure 1;

Figure 3 is a rear elevation of the seat and seat cover of Figure 1 on a somewhat reduced scale, one upper corner portion of the seat cover being shown in an alternative position;

Figure 4 is an end elevation of the structure shown in Figure 3;

Figure 5 is a plan view of the seat throw or cover per se when removed from the seat and in approximately flat condition;

Figure 6 is an enlarged fragmentary section on the line 6—6 of Figure 2;

Figure 7 is a similarly enlarged fragmentary section on the line 7—7 of Figure 2;

Figure 8 is a view corresponding to Figure 1, but showing the seat cover of Figure 1 as applied to a seat of somewhat different dimensions than the seat of Figure 1;

Figure 9 is a front perspective view of a modified form of seat cover adapted for application to an automobile seat of the type having separate back sections.

Referring now in detail to the accompanying drawings, and first considering the preferred form of seat throw as illustrated in Figures 1 to 7, inclusive, the reference character C designates the seat cushion portion of an automobile seat having a usual cushioned back rest portion B. The seat comprising the two portions B and C may be either supported directly on the floor of the automobile or may be supported somewhat above the automobile floor by any suitable means such as is generally exemplified by the pedestal P.

The seat cover is preferably of one piece integral construction, being formed from a sheet of any suitable flexible fabric. It includes a cushion cover section 10 overlying the seat cushion C and having marginal end and front skirt portions 11 and 12 respectively depending adjacent the end and front edges of the seat cushion. Skirt portions 11 and 12 may be stitched together or otherwise interconnected along their intersection 13 or, if desired, the projecting corner portion normally left when folding down such skirt portions 11 and 12 may be tucked beneath one or the other or both of said skirt portions.

Depending from the respective skirt portions 11 and 12 and securely anchored thereto are a plurality of draw string supports 14. These supports are spaced at intervals around the periphery of the skirt portions 11 and 12 and are formed in any suitable manner to define loops at their lower ends whereby a draw string in the form of a belt 15 in the preferred embodiment may be slideably disposed through and supported in the looped ends of these supports 14 to draw them toward each other beneath the seat cushion 10, the ends of the draw belt 15 preferably being adjustably connected in the form of an endless loop as by means of the usual belt buckle 16, shown in Figures 1 and 3. It will be found desirable to form the supports 14 of straps of elastic material reversely folded with their free upper end portions respectively sewed or otherwise firmly anchored to the skirt portions 11 and 12 of the cushion cover 10, whereby the lower end portion of each of these supports 14 will define a suitable loop as above mentioned. The elasticity of these supports 14 as employed in the preferred embodiment will enable them to maintain a definite tension or downward pull on the skirt portions 11 and 12 at all times to thus maintain the section 10 of the cover in snug conforming relation over the seat cushion C.

Integrally connected to the cushion cover section 10 along the rear edge thereof is a back rest cover section 17 which extends upwardly over the front surface of the back rest B thence over and around the upper edge portion of the back rest to provide a depending rear flap 18. The lower generally horizontal edge of this flap 18 is formed with a hem 19 for slideable reception of a draw string element exemplified by the flexible belt 20, the opposite ends of which will preferably be slideably connected to the draw string element 15 through means which are hereinafter more fully described. In addition to the depending flap 18 the back rest cover section 17 is preferably also provided with end wings 21 which extend laterally at least partially around the opposite end edges of the back rest B and which are interconnected to flap 18 by draw string 20 to form a pocket for conforming reception of the upper end of back rest B.

At their upper edges these respective end wings are preferably separated from the flap 18 by means of inwardly extending slots 22 whereby they may fit more snugly around the upper corner of the back rest B. Similarly, each of these end wings is separated from its adjoining skirt portion 11 by an inwardly extending slot or notch 23. The purpose of these notches 23 also is to permit the end wings 21 to be folded rearwardly about the adjoining ends of the back rest and thus away from the skirt portions 11 in a smooth and unrumpled manner.

In order to facilitate a smooth fit of the upper corner portions 24′ (Figure 3) of the back rest cover section 17, these corner portions may be tucked beneath the adjoining areas of the flap 18 and the respective end wings 21 as is best illustrated by the reference character 24 in Figures 1, 2 and 3; or, if desired, the projecting portion 24′ such as is shown in Figure 3 may be left in its projecting state without being so tucked in, although the appearance and the apparent fit of the seat cover in such case will not be quite as pleasing as in the arrangement shown at 24.

In order to connect the back rest cover portion (and through it the ends of the draw belt 20) to the draw belt 15 as above mentioned, the draw belt 20 is preferably slideably disposed through hems 25 formed in the rear edges of the upper portions of the end wings 21 and the ends of the strap or belts 20 are then adjustably buckled, as at 26, to a strap 27 which is sewed or otherwise securely anchored to the lower portion of each such end wing 21. The lower edge portions of the back rest cover 17 are connected to the lower draw string 15 by means of the depending loop elements 28 which slideably receive the element 15 in a manner similar to that of the supporting loops 14.

In order to permit ready access to the buckle 26 for the purpose of adjusting the tension on the opposite end portions of the draw string 20 the end wings 21 are preferably cut away or notched as at 29. With this arrangement it will be seen that the draw string 20 is slideably connected to the draw string 15 through the depending loops 28, the end wings 21, straps 27 and buckles 26, all of which portions serve as continuations of the draw string 20.

It will be seen that the connection between the seat structure and the seat throw or cover of the invention is primarily by way of the draw strings and the pocket defined by flap 18 and wings 21 as above described. Thus the seat cover is not locally connected to the seat structure at any point. The arrangement of the draw string 15 is such that through its sliding connection with the several depending loops or supports 14 and 28 it will exert an equalized downward pull or tension on each of the said supports. Moreover, due to such equalized tension the danger of tearing any portions of the seat cover are greatly diminished and the adaptability of the cover to seats of varying sizes and shapes is greatly enhanced.

By way of illustration of such adaptability it will be noted that the seat cover has been illustrated in Figures 1 to 7 inclusive as applied to a seat having a relatively thick seat cushion and also a relatively thick back support. However, in Figure 8 the same seat cover is shown as applied to an automobile seat of somewhat different dimensions including a substantially thinner seat cushion and also a substantially thinner back rest than in Figures 1 to 7. In this arrangement, the application of the seat cover portion 10 to the seat cushion is identical with that heretofore described. It will be seen that the skirt portions 11 and 12 extend to a lower point on the seat cushion than in Figure 1. However, the back rest cover portion 17 as applied to this type of seat will have its end wings 21 extending completely around the end edges of the back rest and in the rear thereof. The straps or supports 28 will thus be disposed rearwardly of the back rest with the lower ends of the looped portions 28 extending forwardly beneath the back rest for slideable reception of the draw string 15. In this arrangement, as in Figures 1–7, the draw string 15 will transmit a downward pull through the supports 28 tending to draw downwardly and thus tension the portion 17 over the back rest while also tensioning strap 20 to pull the end wing portions 21 laterally toward each other to thus stretch the cover portion 17 laterally over the front of the back rest.

In Figure 9 there is shown a modification of the invention in which the seat cover is adapted for use with a seat of the type having a divided back rest portion. In this modification the seat cover portion 10 and its manner of association with the seat cushion C remain exactly as heretofore described. However, the back rest cover portion is medially vertically slotted from its upper end portion as at 30 in registry with the division between the two back rests B′ so that the cover portions 17′ will register with the respective back rests B′. With this arrangement it is necessary to provide separate draw strings or straps 20′ in association with each back rest cover portion 17′. Thus it has been found convenient to anchor the laterally inner end of each such draw string or strap 20′ to the laterally inner edge of its associated portion 17′. From its point of anchorage each such draw strap or string 20′ is then taken around the inner vertical edge of its associated back rest portion B′ thence may be drawn through the hem in the rear depending flap (not shown) of its portion 17′ and associated with the end wing 21 in the same manner as in the preferred embodiment.

In this application I have shown and described only the preferred embodiment together with a single modification of the invention; however, the invention is capable of other embodiments and its several details may be modified in various manners all without departing from the spirit and scope of the invention as defined in the claims hereinafter following. Accordingly, the drawings and description herein are to be construed as merely illustrative in nature rather than as restrictive.

Having thus described the invention what is claimed as new and desired to be secured by Letters Patent is:

1. In combination with an automobile seat comprising a seat cushion having an upwardly presented supporting surface and a vertically extending back rest, a seat cover comprising a flexible cushion cover section overlying said surface, a back rest cover section including means defining a pocket receiving the upper portion of said back rest, a flexible draw string in the form of a horizontal endless loop beneath said seat slidably associated with the marginal portions of said seat cover, and a second draw string connected to said back rest cover section and extending generally vertically downwardly therefrom, the downwardly extending portions of the draw string being slidably connected to said loop for tightening incident to tightening of the loop.

2. In combination with an automobile seat comprising a seat cushion having an upwardly presented supporting surface and a vertically extending back rest, a seat cover comprising a flexible cushion cover section overlying said surface, draw string supports depending from said cover section adjacent the front and end edges of said cushion, a back rest cover section including means defining a pocket for receiving the upper portion of said back rest, draw string supports depending from said back rest cover section, and a flexible draw string in the form of a horizontal endless loop beneath the seat cushion slidably disposed through said draw string supports of the cushion cover section and a second draw string slidably disposed through said draw string supports of the back rest cover section and having its ends connected to said loop whereby tightening of said loop will draw both of said sections taut over their corresponding portions of the seat.

3. In combination with an automobile seat having a seat cushion and a back rest, a seat cover comprising a flexible cushion cover section overlying said cushion, and a flexible back rest cover section disposed over the front of said back rest and having a pocket receiving the upper part of said back rest, said pocket including lateral wings extending around the ends of the back rest, and a flap extending over the top of the back rest, a plurality of relatively spaced draw string supports depending from the margin of said cushion cover section, a first draw string in the form of an endless loop disposed entirely beneath said seat cushion in a horizontal plane and slidably interconnecting said supports beneath said cushion, a second draw string slidably associated with and interconnecting said flap and said wings rearwardly of the back rest, and means slidably interconnecting the ends of said second draw string to said first draw string whereby tension on said first draw string will be transmitted to the other said draw string.

4. In combination with an automobile seat having a seat cushion and a back rest, a seat cover comprising a sheet of flexible fabric including a cushion cover section overlying said cushion, said section having marginal end and front skirt portions depending adjacent the ends and front of said cushion, draw string supports depending from said respective skirt portions, a first draw string operatively slidably disposed through the depending ends of said supports and drawing same taut beneath said cushion, a back rest cover section connected along its bottom edge to said cushion cover section, and extending upwardly therefrom over and around the upper edge of the back rest to provide a depending rear flap behind the back rest, a generally horizontal hem being formed in said flap, a second draw string slidably disposed through said hem, and means connecting said second draw string to said first draw string beneath said back rest, whereby tensioning of said first draw string may act through said means and said second draw string to tension said flap over said back rest.

5. The combination of claim 4 in which said back rest cover section includes end wings extending around the opposite end edges and rearwardly of said back rest, said second draw string being operatively slidably connected to said end wings to draw same laterally toward each other rearwardly of the back rest when tensioned by said first draw string.

6. The combination of claim 4 wherein the said connecting means comprises loops of flexible material extending downwardly from said wings and laterally beneath said back rest to slidably receive said first draw string.

7. The combination of claim 4 in which said back rest cover section includes end wings extending around the opposite end edges of said back rest, said wings being formed with hems slidably receiving opposite end portions of said second draw string, and means connecting the ends of said second draw string under tension to said first draw string.

8. The combination of claim 4 in which said back rest cover section includes flexible end wings extending around the opposite side edges and overlying the rear face of said back rest, hems being formed in the respective wings rearwardly of the back rest, said second draw string being slidably disposed through said last mentioned hems, and cooperating with said wings and said depending rear flap to define a pocket receiving the upper portion of said back rest.

9. The combination of claim 6 wherein the said wings have generally vertical marginal edges, the upper portions of said marginal edges being formed with hems slidably receiving said second draw string, the lower portions of said wings being fixedly connected between said loops and said second draw string.

10. The combination of claim 7 wherein said connecting means extend around and beneath the respective end edges of the back rest to be drawn toward each other by said first draw string.

11. The combination of claim 8 in which the gathered material of the back rest cover section between said flap and each of said wings is tucked beneath said flap and said wing.

References Cited in the file of this patent

UNITED STATES PATENTS 2,619,156    Seaman  ---------------- Nov. 25, 1952